(12) United States Patent
Allen

(10) Patent No.: US 7,438,803 B1
(45) Date of Patent: Oct. 21, 2008

(54) DISPOSABLE WEIR LINER

(75) Inventor: Duane C. Allen, Clinton Township, MI (US)

(73) Assignee: Ebbco, Inc., New Baltimore, MI (US)

( * ) Notice: Subject to any disclaimer, the term of this patent is extended or adjusted under 35 U.S.C. 154(b) by 1 day.

(21) Appl. No.: 11/801,129

(22) Filed: May 8, 2007

(51) Int. Cl.
   *B01D 21/02* (2006.01)
(52) U.S. Cl. .................. 210/171; 210/238; 210/521; 210/532.1; 210/538
(58) Field of Classification Search ................. 210/171, 210/232, 237, 238, 521, 532.1, 532.2, 538, 210/540, 801
   See application file for complete search history.

(56) References Cited

U.S. PATENT DOCUMENTS

| | | | | |
|---|---|---|---|---|
| 1,672,583 | A * | 6/1928 | Travers | 210/538 |
| 2,393,498 | A * | 1/1946 | Miller | 210/538 |
| 2,432,203 | A * | 12/1947 | Miller | 210/532.1 |
| 4,268,392 | A * | 5/1981 | Hayes | 210/238 |
| 4,957,621 | A * | 9/1990 | Rohloff | 210/171 |
| 5,458,770 | A * | 10/1995 | Fentz | 210/521 |
| 5,942,128 | A * | 8/1999 | Fortier | 210/171 |
| 6,562,233 | B1 * | 5/2003 | Schilling et al. | 210/232 |
| 7,288,188 | B2 * | 10/2007 | Al-Assfour | 210/538 |
| 2006/0076300 | A1 * | 4/2006 | Mitchell | 210/538 |
| 2007/0251879 | A1 * | 11/2007 | Batten et al. | 210/532.1 |

* cited by examiner

*Primary Examiner*—Christopher Upton
(74) *Attorney, Agent, or Firm*—Harness, Dickey & Pierce, PLC

(57) ABSTRACT

A garnet settling/filtration system for use with a plurality of machine tools such as a water jet cutting machine is described. The garnet settling/filtration system comprises a settling tank, which utilizes a removable, disposable settling weir, which is received therein. The settling weir drops into the settling tank and provides an over-under flow system through which the garnet slurry must travel. As the flow of the slurry travels over and under the incorporated series of baffles, the garnet particulate settles out on the bottom of the liner. Once the liner has reached its maximum holding capacity, a series of incorporated, reinforced removal loops located near the top of the liner allow for the easy and quick removal of the liner and the settled-out particulate from the settling tank. The liner can then be discarded and a new one replaced in a matter of minutes, thereby reducing downtime of the machine.

7 Claims, 3 Drawing Sheets

DISPOSABLE WEIR LINER

FIELD OF THE INVENTION

The present invention relates to abrasive particulate settling/filtration systems for use with machine tools, such as a water jet cutting tool, and more particularly to such a system using a disposable settling tank liner.

BACKGROUND OF THE INVENTION

Water jet tools producing high-pressure jets of water containing abrasive particles are used to cut a variety of materials including metals, stone, ceramics, concrete, tile and glass. A water jet tool connects a high-pressure fluid pump to a cutting head in order to produce an ultra-high-pressure water jet for discharge through a water jet nozzle. Before the water jet is discharged, an abrasive particulate, such as garnet particles, is added to facilitate the cutting of the material. The water containing the abrasive particulate is ejected through the water jet nozzle at a rate of approximately 1 gallon per minute (GPM) onto a workpiece that is restrained on a cutting table. As the water jet containing the abrasive particulate passes through the workpiece, it is collected in a catch tank below. This 1 GPM of heavily contaminated water flows out of the catch tank by gravity into a drain or preferably into a recycling system. Due to the abrasive character of the particulate, the fluid and particulate slurry are abrasive and damaging to the particulate recycling system. In particular, the pump used to draw the particulate slurry through the filtration system is subject to frequent breakdown and to damage caused by the particulate, and this heavy particulate slurry causes frequent filter replacement. A review of prior art particulate filtration systems for use with water jet cutting tools demonstrates this point.

Settling tanks are implemented to collect the particulate matter by means of directing the slurry discharge through a tank having a large volume with an input and an output near the upper portion of the tank. The slurry is pumped into the settling tank, where the volume of the fluid contained therein reduces the flow and turbulence within the tank, allowing the heavier particulate matter to settle towards the bottom and the fluid to flow out through a discharge.

The drawback to this type of system is the need to frequently shut down the system in order to clean out the particulates which have collected in the bottom. This process requires a significant amount of time in which the system is not running, while the maintenance is performed, as well as a significant amount of burdensome cleansing of the settling tank.

Therefore, there is a need for a cost-effective settling/filtration system that will not require shutting down the system for lengthy periods of time in order to clean out the settling tank, increasing the overall efficiency of the process.

SUMMARY OF THE INVENTION

The present invention is directed to a garnet settling/filtration system that provides a solution to the aforementioned problems associated with other settling/filtration systems. The present invention features a garnet settling/filtration system for use with water jet cutting tools. The garnet settling/filtration system comprises a settling tank which utilizes a removable, disposable settling weir, which is received therein. The settling weir drops into the settling tank and provides an over-under flow system through which the garnet slurry must travel. As the flow of the slurry travels over and under the incorporated series of baffles, the garnet particulate settles out on the bottom of the liner. Once the liner has reached its maximum capacity, a series of incorporated, reinforced removal loops located near the top of the liner allow for the easy and quick removal of the liner and the settled-out particulate from the settling tank. The liner can then be discarded and a new one replaced in a matter of minutes, thereby reducing downtime of the water-jet cutting system.

Thus, the invention advantageously provides for a cost-effective efficient system that is capable of settling out the abrasive particulate from the slurry. By allowing the liner to be removed and discarded, significant time is saved from shutting down the entire system while the settling tank is drained and cleaned. Further, since the invention allows for the quick emptying of the settling container of the particulate which has accumulated therein, there is no need to de-sludge such a container.

Although this application is directed towards a settling system for use with water jet cutting machines, it has many applications in the machine tool industry, especially in the settling of machining fines and grinding swarf. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
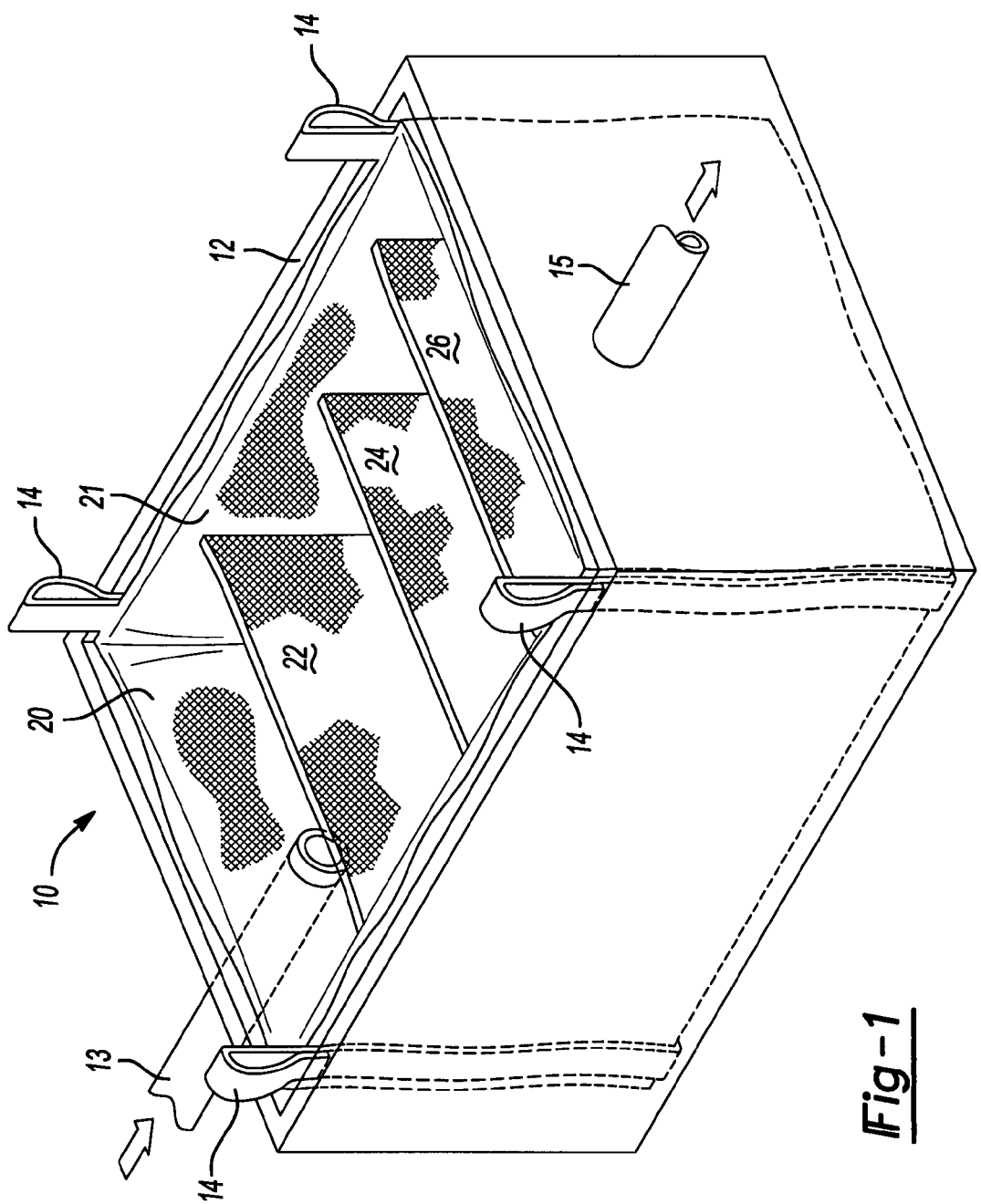
FIG. 1 is a perspective diagram of the primary embodiment of the disposable weir liner, situated within a settling tank.
Figure 2:
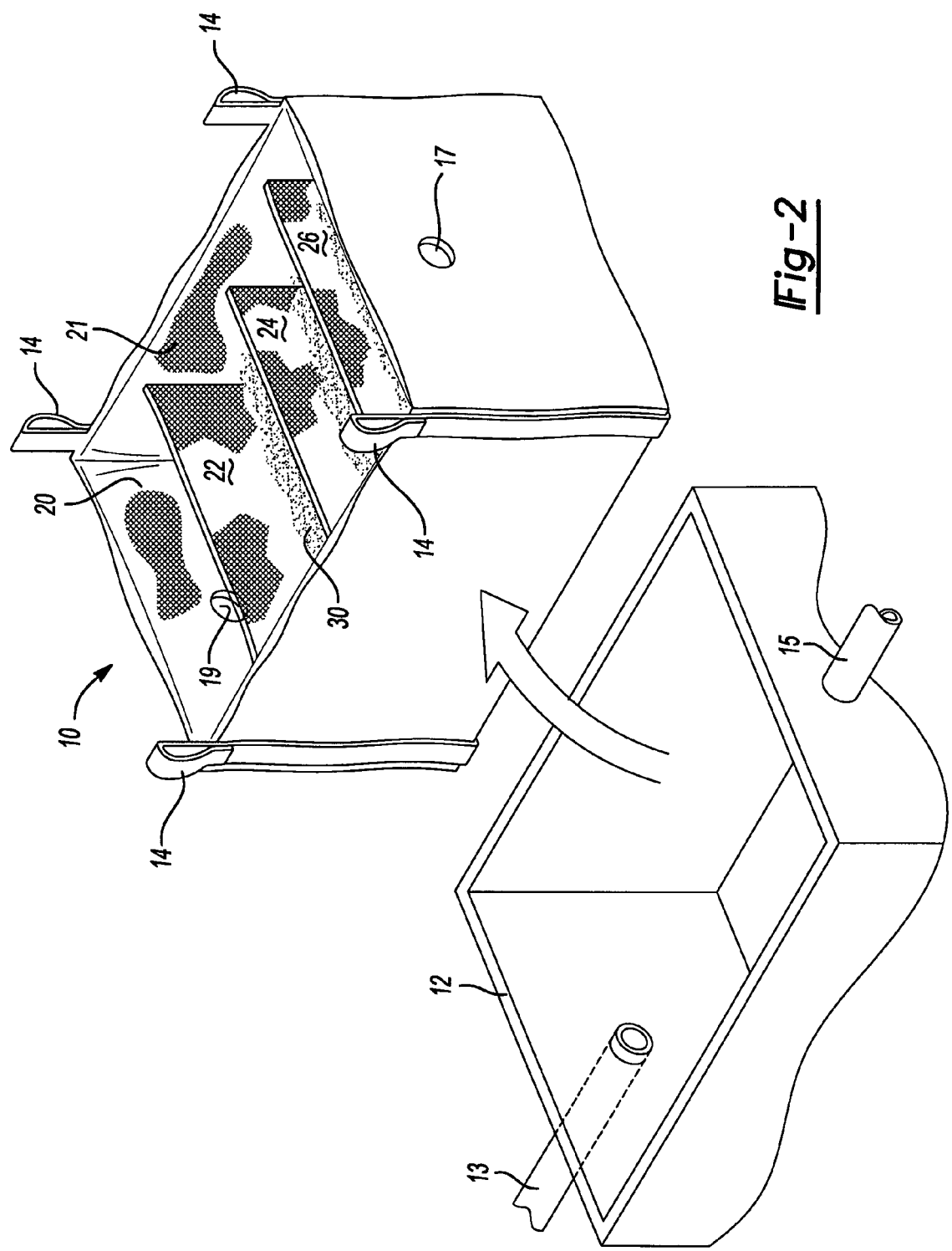
FIG. 2 is a perspective diagram illustrating the simple removal of the liner from the tank, once filled with accumulated particulate matter.
Figure 3:
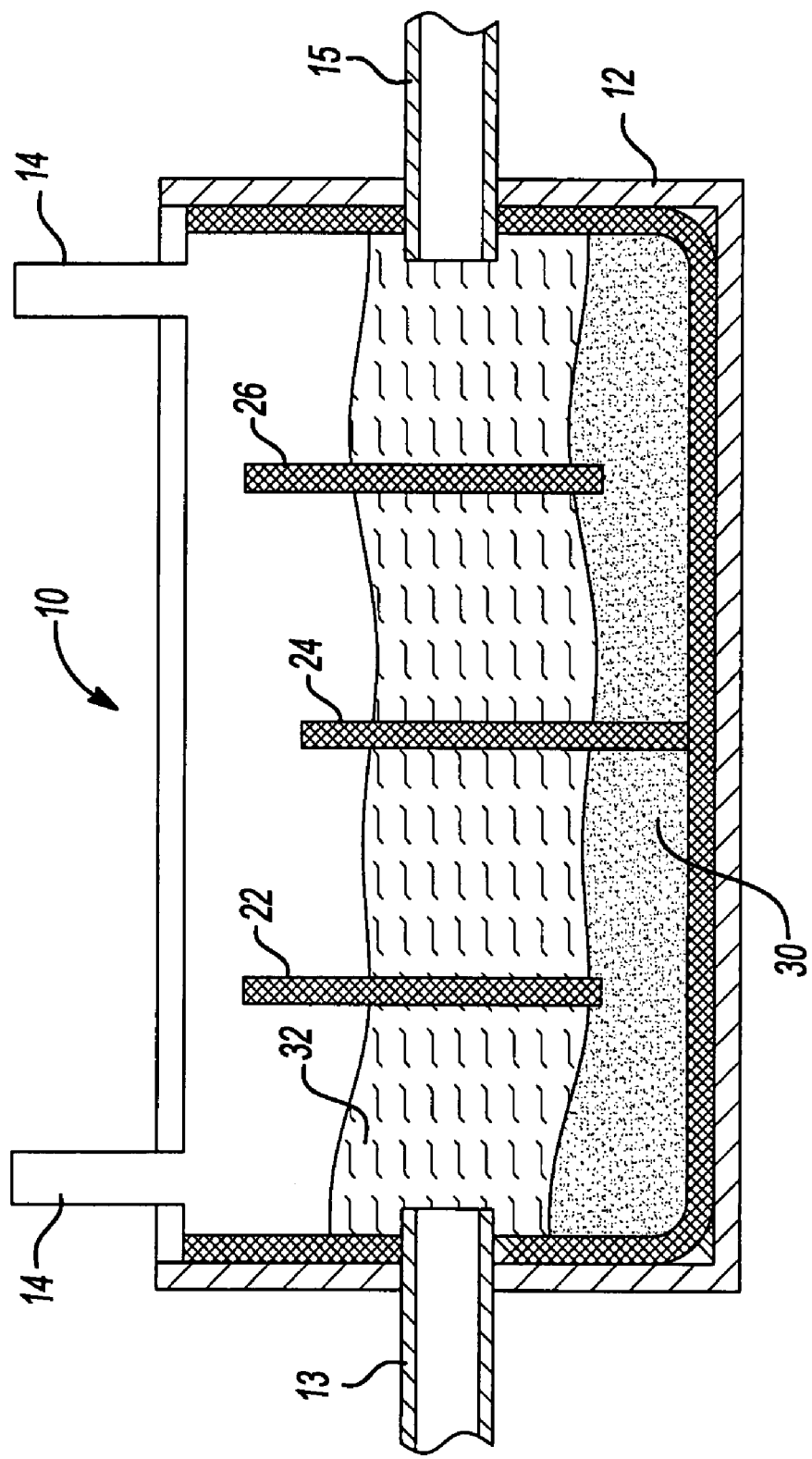
FIG. 3 is a cross-sectional side view of the weir liner within the settling tank, illustrating the integrated baffle system.

Referring to FIGS. 1-3, a primary embodiment of the disposable weir settling/filtration system of the present invention is shown. The disposable settling weir liner 10 shown is of rectangular shape, but it is intended that any shape liner which fits into a corresponding settling tank 12 is within the scope of the present invention manufactured from a durable fabric which is semi-permeable, such as polyester, canvas or other suitable material which allows fluid to pass through, but retains the garnet filtrate which has settled out. Being a semi-permeable material, the liner 10 can be removed from the settling tank 12 and allowed to drip-dry. The weir liner 10 comprises a flexible container having a pair of corresponding end walls 20 and opposing side walls 21 interconnected at the bottom by a base wherein the filtrate 30 is collected during the settling process. The liner 10 is manufactured to fit within a given settling tank 12 dimensions so that the two end walls 20 of the liner match up with the input line 13 and output line 15 located in the walls of the settling tank 12.

An input aperture 19 is formed in one end wall 20 proximal the top of the removable liner 10, which aligns with the input line 13 coming from the machine tool carrying the slurry, and an output aperture 17 is positioned on the opposite end wall, also proximal the top of the liner 10, which aligns with the output line 15, leading the filtered fluid out of the settling tank.

A reinforced lifting handle 14 is positioned in each corner, interconnected around the base near each end wall 20, allowing the liner 10 to be lifted up and removed from the settling tank 12 when it is full of particulate as shown in FIG. 2. As mentioned, the material in which the liner 10 is manufactured from is porous enough to allow fluid 32 to drain from the liner 10 when it is removed, while maintaining the particulate 30 within the disposable liner.

A series of baffle walls 22, 24, and 26 are attached within the liner, interconnecting the side walls 21. These baffles are evenly spaced apart and staggered in a vertical orientation from each other so that the fluid 32 traveling through the liner must travel under the first baffle 22, over the second baffle 24, and under the last baffle 26 before exiting through the output line 15. This staggered arrangement allows for the fluid 32 to travel slower through the liner, allowing more time for the suspended solids or particulate material 30 to settle out towards the bottom of the liner by means of gravity.

The shape and configuration of the liner is manufactured to complement the shape of the settling tank within which it is received. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A particulate settling/filtration system for a machine tool comprising:
    a settling tank, said settling tank having four walls and a bottom yielding a given volume in which a slurry of fluid and particulate matter from said machine tool is transported into, said settling tank having an input and an output on opposing walls proximate the top of the tank;
    a removable, liner, said liner being permeable and comprising four walls and a base yielding dimensions complementary to said settling tank so as said liner will be received within said settling tank, said liner further comprising an input aperture aligning with said input of said settling tank, and an output aligning with said output of said settling tank,
    a plurality of vertically oriented baffles attached within said liner, interconnecting opposing walls perpendicular to the walls comprising the input aperture and the output aperture, so as they are positioned perpendicular to the flow of fluid through the liner from said input aperture to said output aperture, said baffles are alternately staggered vertically from the top of the liner to the bottom of the liner so as to force the flow of slurry to travel under a first baffle, over a second baffle and under a third baffle prior to exiting through said output aperture;
    wherein when said slurry travels through said liner, the flow is decreased to a rate wherein the majority of the particulate matter settles out by means of gravity to the bottom of the liner, and the fluid travels out through said output aperture.

2. The particulate settling/filtration system of claim 1, wherein said liner comprises a plurality of integrated lifting handles, said lifting handles providing a means of vertically removing said liner containing said particulate matter from said settling tank, while retaining the fluid within said settling tank.

3. The particulate settling/filtration system of claim 1, wherein the liner is manufactured from at least one of the following materials: polyester, canvas, and nylon.

4. The particulate settling/filtration system of claim 1, wherein the input and output of said settling tank comprise a collar around which the input aperture and output aperture are received, respectively.

5. The particulate settling/filtration system of claim 1, wherein the output of said settling tank is coupled to a conduit which directs the fluid to a drain.

6. The particulate settling/filtration system of claim 1, wherein the output of said settling tank is coupled to a conduit which directs the fluid to a waste treatment facility.

7. The particulate settling/filtration system of claim 1, wherein the liner is disposable.

* * * * *